United States Patent [19]
Sugiura et al.

[11] Patent Number: 5,714,274
[45] Date of Patent: Feb. 3, 1998

[54] ELECTROLUMINESCENT DEVICE AND METHOD FOR PRODUCING THE SAME

[75] Inventors: Kazuhiko Sugiura, Nagoya; Masayuki Katayama, Handa; Nobuei Ito, Chiryu; Tadashi Hattori, Okazaki, all of Japan

[73] Assignee: Nippondenso Co., Ltd., Kariya, Japan

[21] Appl. No.: 677,332

[22] Filed: Jul. 2, 1996

[30] Foreign Application Priority Data

Jul. 3, 1995 [JP] Japan ................................. 7-167332
Apr. 23, 1996 [JP] Japan ................................. 8-101640

[51] Int. Cl.$^6$ ................................. H05B 33/00
[52] U.S. Cl. ................... 428/690; 428/691; 428/917; 313/504; 427/87; 427/248 B; 445/24; 156/611; 156/612
[58] Field of Search ................ 313/504; 428/690, 428/691, 917; 427/87, 248 B, 448 E; 445/24; 156/611, 612

[56] References Cited
PUBLICATIONS

Tsujiyama et al., "4.4: Bright-Blue Electroluminescence and Hysteresis Behavior in $SrS:CeCl_3$ Thin Films", SID 86 Digest, pp. 37–40, 1986.

*Primary Examiner*—Charles Nold
*Attorney, Agent, or Firm*—Cushman, Darby & Cushman IP Group of Pillsbury Madison & Sutro LLP

[57] ABSTRACT

An electroluminescent device has a luminescent layer including an alkaline earth thiogallate doped with a luminescent center for producing blue light. An insulating layer disposed next to the luminescent layer includes a buffer area contacting the luminescent layer. The buffer area is made from a material which has an amorphous state at a temperature sufficient for crystallization of the alkaline earth thiogallate. Thus, when the device is manufactured, the luminescent layer can be formed in an amorphous state on the insulating layer and heat treated. Since the buffer layer remains in an amorphous state, the formation of alkaline earth sulfides which might degrade the color purity of emitted light at the interface of the crystalline luminescent layer and the amorphous buffer layer can be prevented.

20 Claims, 3 Drawing Sheets

ELECTROLUMINESCENT DEVICE AND METHOD FOR PRODUCING THE SAME

CROSS-REFERENCE TO RELATED APPLICATIONS

The present application is related to and claims priority from Japanese Patent Application Nos. Hei. 7-167332 and 8-101640, incorporated herein by reference.

BACKGROUND OF THE INVENTION

1. Field of the Invention

The present invention relates to electroluminescent (hereinafter referred to as EL) devices which are used in various instruments including, for example, emissive-type segmented displays and matrix displays and displays in various information terminals. The present invention also relates to methods for producing the same.

2. Description of Related Art

Conventional EL devices are formed by laminating a first electrode made of an optically transparent indium tin oxide (ITO) film, a first insulating layer including tantalum pentoxide ($Ta_2O_5$) or the like, a luminescent layer, a second insulating layer, and a second electrode made of an ITO film on an insulating glass substrate in that order.

The luminescent layer includes, for example, a host material such as zinc sulfide (ZnS) with a luminescent center such as manganese (Mn) or terbium (Tb) added thereto, or a host material such as strontium sulfide (SrS) with a luminescent center such as cerium (Ce) added thereto.

EL devices give different colors depending on the choice of the additives in the host. For example, those having Mn as the luminescent center in a ZnS host produce yellowish-orange light, while those having Tb produce green colors. EL devices having Ce as the luminescent center in an SrS host produce bluish green light.

To realize full-color EL displays, luminescent layers capable of producing red, green and blue light must be formed. Of these, SrS with a luminescent center of Ce is generally used as the material for the blue-emitting layers in EL devices. However, this material naturally produces a bluish-green light. Therefore, in order to attain pure blue emission, a filter capable of cutting off the green component from the emission spectrum must be used.

As opposed to this, it is known that an EL device with alkaline earth thiogallates ($MGa_2S_4$ in which M=Ca, Sr or Ba) as the host material of the luminescent layer having Ce added as the luminescent center element can produce a blue color without using a filter, for example, as reported in SID 93 Digest, pp. 761-764 (1993).

As reported in the above-mentioned publication, in the process for manufacturing EL devices with alkaline-earth metal thiogallates ($MGa_2S_4$ in which M=Ca, Sr or Ba) as the host material of the luminescent layer doped with Ce as the luminescent center element, a high temperature heat treatment at a temperature 600° C. or more becomes necessary.

In the heat treatment process for crystallization of the luminescent layer, when a conventional insulating layer such as $Ta_2O_5$, strontium titanate ($SrTiO_3$) or the like underlies the luminescent layer, alkaline-earth metal sulfides, e.g., CaS, SrS and BaS, grow, thus resulting in a problem wherein the luminescent color changes.

To put it concretely, in the case of calcium thiogallate ($CaGa_2S_4$) doped with Ce, since the natural blue-emitting color produced from the calcium thiogallate:cerium ($CaGa_2S_4$:Ce) luminescent layer mixes with the green-emitting color produced from calcium sulfide:cerium (CaS:Ce), the blue color purity is lowered. In the case of strontium thiogallate ($SrGa_2S_4$) doped with Ce, since the natural blue-emitting color produced from the strontium thiogallate: cerium ($SrGa_2S_4$:Ce) luminescent layer mixes with the bluish green emitting color produced from strontium sulfide: cerium (SrS:Ce), the blue color purity is lowered similarly.

SUMMARY OF THE INVENTION

The present invention has been accomplished in view of the above-mentioned problems and an object of the present invention is to provide EL devices with alkaline earth thiogallate luminescent layers wherein growth of alkaline earth metal sulfides is prevented to improve the light emitting color purity.

The present inventors have considered that the growths of alkaline earth metal sulfides are caused by an insulating layer underlying the luminescent layer. The conventional insulating layer such as $Ta_2O_5$ or $SrTiO_3$ or the like has a crystalline structure at the temperature for crystallization of the alkaline earth thiogallate luminescent layer. Therefore, under the heat treatment for crystallization of the luminescent layer, if the underlying insulating layer is in an amorphous state, it causes the growth of alkaline earth metal sulfides, thereby changing the EL light emitting color.

Based on the above-mentioned consideration, the present inventors have found that when the underlying insulating layer has the crystalline structure, alkaline earth metal sulfides grow easier than alkaline earth thiogallates, whereas when the underlying insulating layer has the amorphous structure, the growth of alkaline earth thiogallates becomes easy while the growth of alkaline earth metal sulfides is prevented.

On the basis of these discoveries, the present inventors have completed the present invention.

According to the present invention, the alkaline earth thiogallate luminescent layer is formed on an insulation material which is in an amorphous state at the temperature at which the luminescent layer is crystallized.

Therefore, when the luminescent layer is crystallized, the growth of alkaline earth metal sulfides is prevented consequently, the emitting color purity from the luminescent layer can be heightened.

Other objects and features of the present invention will become more readily apparent from a better understanding of the preferred embodiments described below with reference to the following figures.

BRIEF DESCRIPTION OF THE DRAWINGS

Additional objects and advantages of the present invention will be more readily apparent from the following detailed description of preferred embodiments thereof when taken together with the accompanying drawings in which.

3

Figure 5:
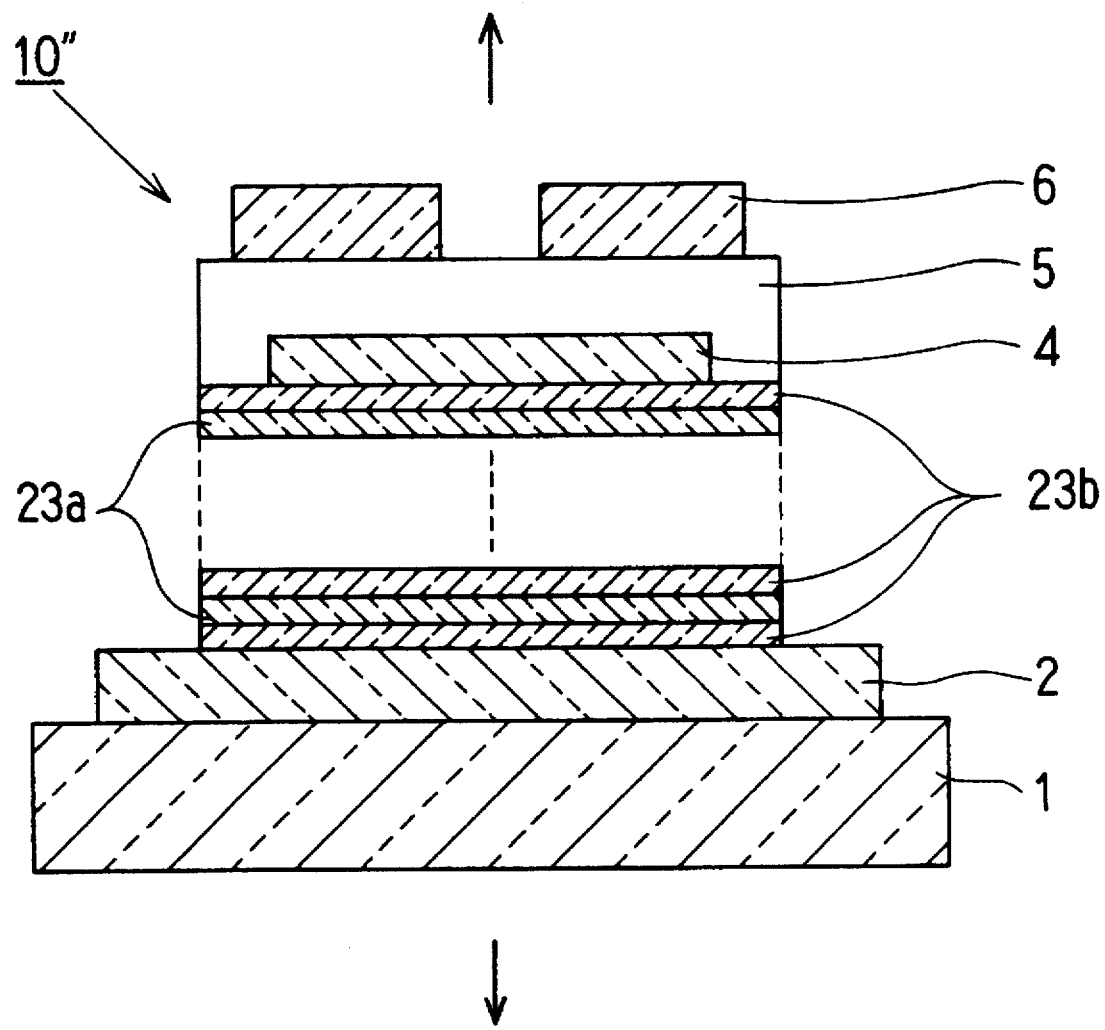

FIG. 5 is a cross-sectional view showing an EL device according to a third preferred embodiment of the present invention.

DETAILED DESCRIPTION OF THE PRESENTLY PREFERRED EXEMPLARY EMBODIMENTS

Embodiments according to the present invention will be described hereinunder with respect to the drawings.

(First Embodiment)

Figure 1:
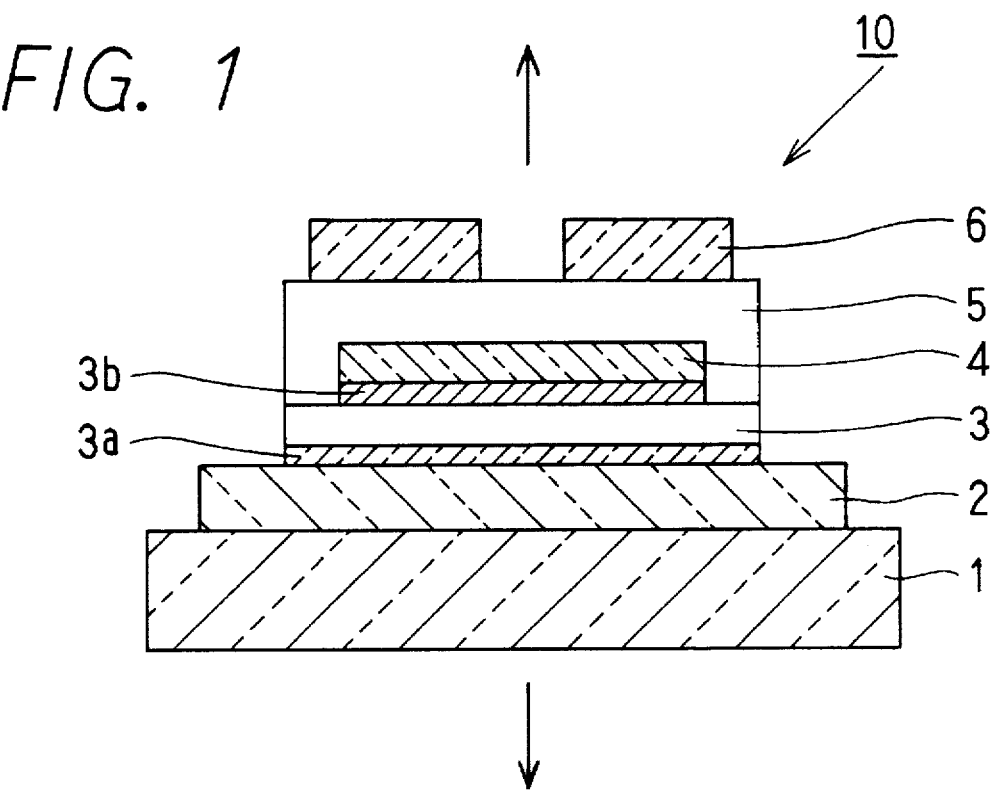
FIG. 1 is a cross-sectional view showing an EL device according to a first preferred embodiment of the present invention.

FIG. 1 is a schematic view showing the cross-section of a thin film EL device 10 according to the first embodiment of the present invention. In the EL device 10 in FIG. 1, the light is emitted in the direction indicated by the upside and downside arrows.

In the EL device 10, a first electrode 2 made of optically transparent ITO is formed on an insulation glass substrate 1, while a buffer layer 3a made of optically transparent silicon oxynitride (SiON), an insulating layer 3 made of $SrTiO_3$, a buffer layer 3b made of SiON, a luminescent layer 4 made of pollycrystalline $CaGa_2S_4$ doped with Ce as a luminescent center, an insulating layer 5 made of $SrTiO_3$, and a second electrode 6 made of ITO are formed on the upper face of the electrode 2. In the first embodiment, a first insulating layer includes the buffer layer 3a, the insulating layer 3, and the buffer layer 3b, while a second insulating layer includes the insulating layer 5.

The thickness of the transparent electrodes 2, 6 is 300 nm each, that of the insulating layers 3, 5 is preferably 600 nm each, that of the buffer layers 3a, 3b is preferably 50 nm each, and that of the luminescent layer 4 is preferably 600 nm. The thickness of each layer is measured at the center of the glass substrate 1.

The method for producing the thin film EL device 10 referred above is described below.

First, the first transparent electrode 2 made of ITO is deposited on the glass substrate 1 by a sputtering method. Next, the buffer layer 3a made of SiON is deposited on the first transparent electrode 2 by the sputtering method. The insulating layer 3 made of $SrTiO_3$ is deposited on the buffer layer 3a by sputtering. More specifically, a mixed gas comprising Ar and oxygen ($O_2$) is introduced into the forming chamber while the glass substrate 1 is maintained at a predetermined temperature, and a film of the layer 3 is deposited at an RF power of 1 kW with sintered $SrTiO_3$ as a sputtering target. Further, SiON which is the material of the buffer layer 3b has an amorphous structure.

The buffer layer 3a can prevent an increase in resistance and blackening of the first transparent electrode 2 which are caused by the diffusion between the ITO of the first transparent electrode 2 and the $SrTiO_3$ of the insulating layer 3.

An alternative method to form the insulating layer 3 is a sol-gel process. In particular, naphthenic acid strontium is used as a raw material of strontium (Sr) and tetra-butoxytitanium (($C_4H_9O)_4Ti$) is used as a raw material of titanium (Ti). After diluting each raw material with butanol ($C_4H_9OH$) into 10% solution and mixing them, the mixing solution is coated on the glass substrate and then is sintered at 600° C. after drying, whereby the transparent $SrTiO_3$ insulating layer 3 can be formed.

Next, the buffer layer 3b made of SiON is formed on the insulating layer 3 in the same way as the buffer layer 3a. SiON, which is the material of the buffer layer 3b, has an amorphous structure.

4

The $CaGa_2S_4$:Ce luminescent layer 4 including $CaGa_2S_4$ as a host material doped with Ce as a luminescent center is deposited on the buffer layer 3b by sputtering. Concretely, a mixed gas comprising Ar and hydrogen sulfide ($H_2S$) of which an amount is 20 mol % is introduced into the forming chamber while the glass substrate 1 is maintained at a constant temperature of 300° C., and the luminescent layer 4 is deposited at an RF power of 300 W. A sintered target $CaGa_2S_4$ doped with Ce is used as the sputtering target.

Next, the thus-sputtered $CaGa_2S_4$:Ce luminescent layer is heat-treated in an Ar atmosphere containing 20 mol % of $H_2S$ at 650° C. (the crystallization temperature) for 30 minutes. As a result, the $CaGa_2S_4$:Ce luminescent layer 4, which is in an amorphous state and therefore is not electroluminescent immediately after the formation, becomes crystalline and electroluminescent. At the temperature for crystallization of the luminescent layer 4, SiON which is the material of the buffer layer 3b does not become crystalline because the temperature for crystallization of SiON is over 650° C.

In the heat treatment process for crystallization, the first transparent electrode 2 is fixed and masked by a glass mask so that it is not exposed. Therefore, a reaction between ITO of the first transparent electrode 2 and $H_2S$ can be prevented. Further, the diffusion between the first transparent electrode 2 and the insulating layer 3 can be prevented by the buffer layer 3a even under the heat treatment.

Next, on the luminescent layer 4, the insulating layer 5 made of $SrTiO_3$ is formed in the same way as the insulating layer 3.

Then, the second transparent electrode 6 made of ITO is formed on the insulating layer 5 in the same way as the first transparent electrode 2.

In the above-mentioned production method, the buffer layer 3b inhibits the growth of CaS under the heat treatment for crystallization of the luminescent layer 4. This is explained with reference to X-ray diffraction spectra of the luminescent layer 4.

Figure 2:
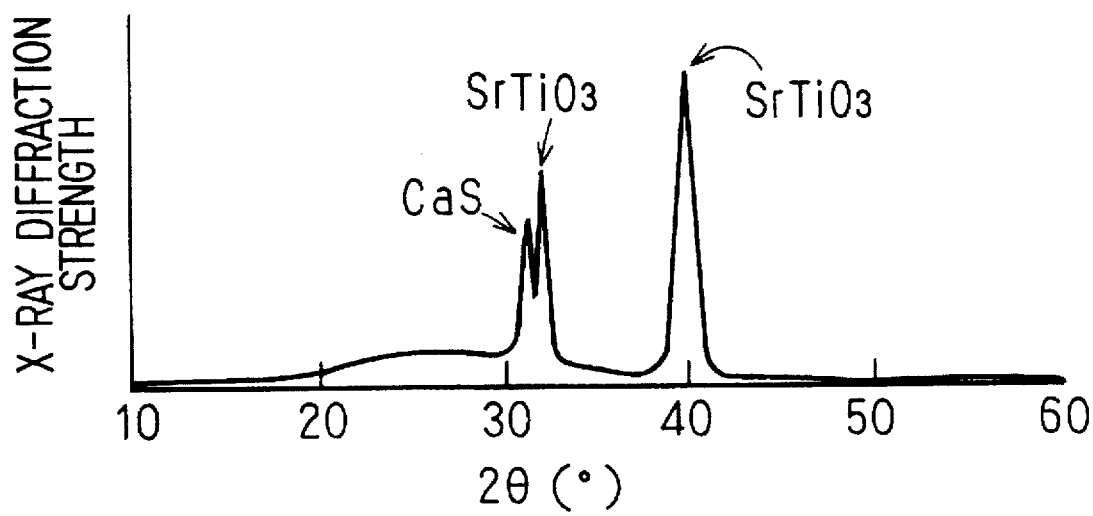
FIG. 2 is a graph showing the X-ray diffraction spectrum for the EL device when a buffer layer is not formed.
Figure 3:
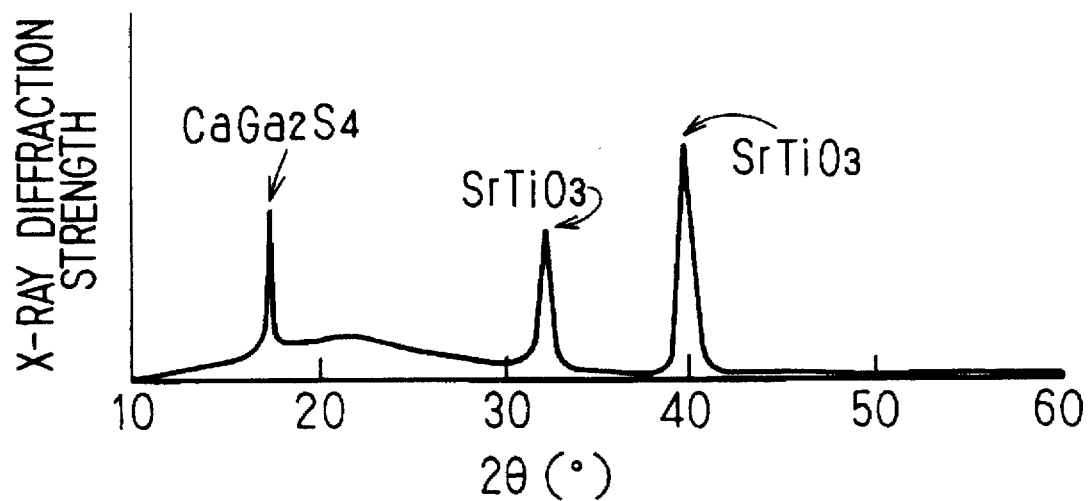
FIG. 3 is a graph showing the X-ray diffraction spectrum for the EL device when the buffer layer is formed.

FIG. 2 shows a X-ray diffraction spectrum in the case wherein the luminescent layer 4 is crystallized without the formation of the buffer layer 3b. A peak of the $SrTiO_3$ insulating layer 3 is exhibited and simultaneously a peak of CaS is exhibited. On the other hand, as shown in FIG. 3, in a X-ray diffraction spectrum in the embodiment wherein the buffer layer 3 is formed, the peak of CaS is not exhibited and instead a peak of $CaGa_2S_4$ is exhibited. As FIG. 2 shows, when the luminescent layer 4 is formed directly on the insulating layer 3 without the buffer layer 3b, the presence of CaS in the luminescent layer 4 increases and the peak of $CaGa_2S_4$ falls below the diffraction spectrum noise level. Therefore, the peak of $CaGa_2S_4$ is not exhibited in FIG. 2.

Aluminum oxide ($Al_2O_3$), silicon dioxide ($SiO_2$), or silicon nitride ($Si_3N_4$) can be used besides SiON as the buffer layers 3a and 3b.

(Second Embodiment)

Figure 4:
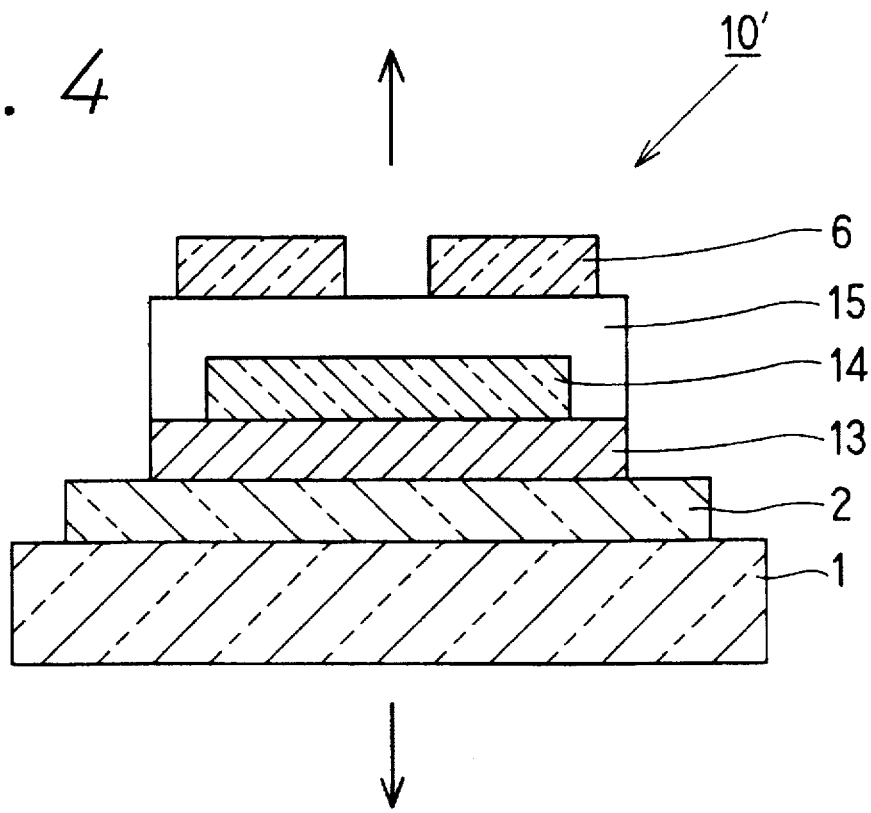
FIG. 4 is a cross-sectional view showing an EL device according to a second preferred embodiment of the present invention.

FIG. 4 is a schematic view showing the cross-section of a EL device 10' according to the second embodiment of the present invention.

In the second embodiment, the buffer layers 3a, 3b are not formed and insulation layers 13 and 15 made of SiON are used instead, while a luminescent layer 14 is constituted of $SrGa_2S_4$ doped with Ce as the luminescent center.

The method for producing the EL device 10' in the second embodiment is described below.

First, the first electrode 2 made of ITO and the first insulating layer 13 made of SiON are formed on the glass substrate 1 by sputtering.

Next, the $SrGa_2S_4$:Ce luminescent layer 14 comprising $SrGa_2S_4$ as the host material doped with Ce as the luminescent center is formed on the first insulating layer 13 by means of a metallorganic chemical vapor deposition (MOCVD) method.

In particular, the pressure of the atmosphere in a forming chamber is reduced while the glass substrate 1 is maintained at a constant temperature of 550° C. Thereafter, bisdipivaloylmethanate strontium $(Sr(C_{11}H_{20}O_2)_2)$ with Ar as a carrier gas, triethylgallium $(Ga(C_2H_5)_3)$ also with Ar as a carrier gas and $H_2S$ diluted with Ar gas are introduced into the forming chamber. Further, tridipivaloylmethanate cerium $(Ce(C_{11}H_{20}O_2)_3)$ with Ar carrier gas is introduced into the forming chamber in order to dope the luminescent center element. The above-mentioned source gases react and pyrolytically decompose, thereby depositing the $SrGa_2S_4$:Ce luminescent layer 14. In this case, to prevent the reaction between the transparent electrode and $H_2S$, a glass mask is similarly used for the first transparent electrode 2 to avoid exposure thereof while the luminescent layer 14 is being deposited and heat-treated for crystallization at 650° C. for thirty minutes.

Next, the second insulating layer 15 made of SiON is formed on the luminescent layer 14 in the same way as the first insulating layer 13.

The second transparent electrode 6 made of ITO is formed in the same way as the first transparent electrode 2.

In the case of the second embodiment, since the first insulating layer 13 is made of SiON, it is not necessary to form the buffer layer as in the first embodiment and the growth of SrS can be prevented merely by the first insulating layer 13. As a result, the insulating layer becomes thin, and its drive voltage can be decreased.

In the second embodiment, the thickness of the first and second transparent electrodes 2, 6 is preferably 300 nm each, that of the first and second insulating layers 13, 15 is preferably 150 nm each, and that of the luminescent layer 14 is preferably 600 nm.

(Third Embodiment)

FIG. 5 is a schematic view showing the cross-section of a EL device 10" according to a third preferred embodiment of the present invention.

In the third embodiment, the first insulating layer in the first embodiment is formed by laminated layers of aluminum oxide 23b and titanium oxide 23a.

The method for producing the EL device is described below.

After the formation of the first transparent electrode made of ITO on the glass substrate 1, the laminated layers of aluminum oxide/titanium oxide are formed by an atomic layer epitaxy (ALE) method.

Concretely, as a first step, source gases, which are trimethylaluminum $(Al(CH_3)_3)$ as a source gas of aluminum and oxygen-containing gas as a source gas of oxygen, are introduced into the ALE device alternately so as not to react with each other in the gas phase while the glass substrate 1 is maintained at 400° C., so that the aluminum oxide layer 23b is formed. Triethylaluminum $(Al(C_2H_5)_3)$ or aluminum chloride $(AlCl_3)$ may be used as the source gas of aluminum and water may be used as the source gas of oxygen.

As a second step, source gases, which are tetraisopropoxytitanium $(Ti(i-OC_3H_7)_4)$ as a source gas of titanium and an oxygen-containing gas as the source gas of oxygen are introduced alternately so as not to react with each other in the gas phase in the same way as the first step, so that the titanium oxide layer 23a is formed. Titanium tetrachloride $(TiCl_4)$ may be used as the source gas of titanium and water may be used as the source gas of oxygen. When the substrate temperature is between 300° C. and 550° C., the layer can be formed similarly to the layer in the first step.

The laminated layers of aluminum oxide/titanium oxide are formed in such a process wherein the first and second steps are repeated to form layers of predetermined thicknesess and stopped after the uppermost layer, which is the aluminum oxide layer 23b is formed. The laminated layers collectively form the first insulating layer. Thereafter, like the first embodiment, a $CaGa_2S_4$:Ce luminescent layer 4 is formed and heat-treated for crystallization at 650° C. for five minutes. The second insulating layer 5 made of $SrTiO_3$ and the second transparent electrode 6 are formed on the luminescent layer 4.

As referred to above, when the uppermost part of the laminated layers of aluminum oxide/titanium oxide is the aluminum oxide layer 23b, the uppermost part of the aluminum oxide layer 23b works as a buffer layer like the buffer layer 3b in the first embodiment, thereby preventing the growth of CaS under heat treatment for the luminescent layer 4. Consequently, the EL device of which blue color purity is fine can be attained. However, when the uppermost part is the titanium oxide layer 23a, the luminescent layer 4 is formed thereon and heat-treated for crystallization at 650° C. for five minutes. In this case, the crystals of CaS grow, whereby the green emitting color mixes with the emitting color from the luminescent layer 4. Consequently, the blue color purity is decreased.

Further, since the heat resistance of the laminated layers of aluminum oxide/titanium oxide is superior to that of $SrTiO_3$ or $Ta_2O_5$, the laminated layer is suitable for the process which needs a heat treatment at a high temperature.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An electroluminescent device comprising:
   first and second electrodes;
   a luminescent layer, disposed between said first and second electrodes, including an alkaline earth thiogallate doped with a luminescent center; and
   first and second insulating layers respectively disposed between said luminescent layer and said first electrode, and between said luminescent layer and said second electrode;
   wherein said first insulating layer includes a buffer material which is in an amorphous state, said buffer material having a crystallization temperature higher than that of said alkaline earth thiogallate, and
   said luminescent layer is disposed immediately above said buffer material of said first insulating layer.

2. The device of claim 1, wherein said first insulating layer includes at least one compound selected from the group consisting of aluminum oxide, silicon nitride, silicon oxide, and silicon oxynitride.

3. The device of claim 1, wherein said buffer material is an insulation material.

4. The device of claim 3, wherein said buffer material includes at least one compound selected from the group consisting of aluminum oxide, silicon nitride, silicon oxide, and silicon oxynitride.

5. The device of claim 1, said first insulating layer comprising:

a crystalline layer; and a buffer layer, including said buffer material, said buffer layer being disposed on said crystalline layer;

wherein said luminescent layer is disposed immediately above said buffer layer.

6. The device of claim 5, wherein said crystalline layer includes crystalline titanium oxide and said buffer layer includes amorphous aluminum oxide.

7. A method of manufacturing an electroluminescent device, said method comprising the steps of:

forming a first electrode;

forming a first insulating layer on said first electrode;

forming a luminescent layer by depositing an alkaline earth thiogallate doped with a luminescent center on said first insulating layer;

forming a second insulating layer on said luminescent layer; and forming a second electrode on said second insulating layer;

wherein said first insulating layer forming step includes a step of forming a buffer layer in an amorphous state, said buffer layer having a crystalline temperature higher than that of said alkaline earth thiogallate, and wherein said luminescent layer is formed immediately above said buffer layer.

8. The method of claim 7, further comprising a step of heat treating said luminescent layer to crystallize said luminescent layer after forming said luminescent layer, while maintaining said buffer layer in said amorphous state.

9. The method according to claim 7, wherein said first insulating layer forming step includes a step of forming alternating layers of materials, one of which is crystalline at a temperature sufficient to make said alkaline earth thiogallate crystalline, and wherein said buffer layer is disposed immediately above said alternating layers of said first insulating layer.

10. The method of claim 7, wherein said buffer layer is an insulating layer.

11. The method of claim 8, wherein said buffer layer prevents formation of alkaline earth metal sulfide in said luminescent layer during said step of heat treating said luminescent layer.

12. The method of claim 7, wherein said buffer layer includes at least one compound selected from the group consisting of aluminum oxide, silicon nitride, silicon oxide, and silicon oxynitride.

13. The method of claim 7, wherein a portion of said first insulating layer other than said buffer layer is a crystalline layer.

14. The method of claim 13, wherein said portion of said first insulating layer other than said buffer layer includes strontium titanate and said buffer layer includes silicon oxynitride.

15. The method of claim 7, wherein said first insulating layer includes at least one compound selected from the group consisting of aluminum oxide, silicon nitride, silicon oxide, and silicon oxynitride.

16. An electroluminescent device comprising:

first and second electrodes;

a luminescent layer, disposed between said first and second electrodes, including an alkaline earth thiogallate doped with a luminescent center;

first and second insulating layers respectively disposed between said luminescent layer and said first electrode, and between said luminescent layer and said second electrode; and a buffer layer disposed between said first insulating layer and said luminescent layer to directly contact said luminescent layer, said buffer layer being in an amorphous state and including a material having a crystallization temperature that is higher than that of said alkaline earth thiogallate.

17. The device of claim 16, wherein said buffer layer includes at least one compound selected from the group consisting of aluminum oxide, silicon nitride, silicon oxide, and silicon oxynitride.

18. The device of claim 16, wherein said first insulating layer is a crystalline layer.

19. The device of claim 16, wherein said first insulating layer includes strontium titanate and said buffer layer includes silicon oxynitride.

20. The device of claim 16, wherein a thickness of said buffer layer is approximately 50 nm.

* * * * *